United States Patent Office 3,327,459
Patented June 27, 1967

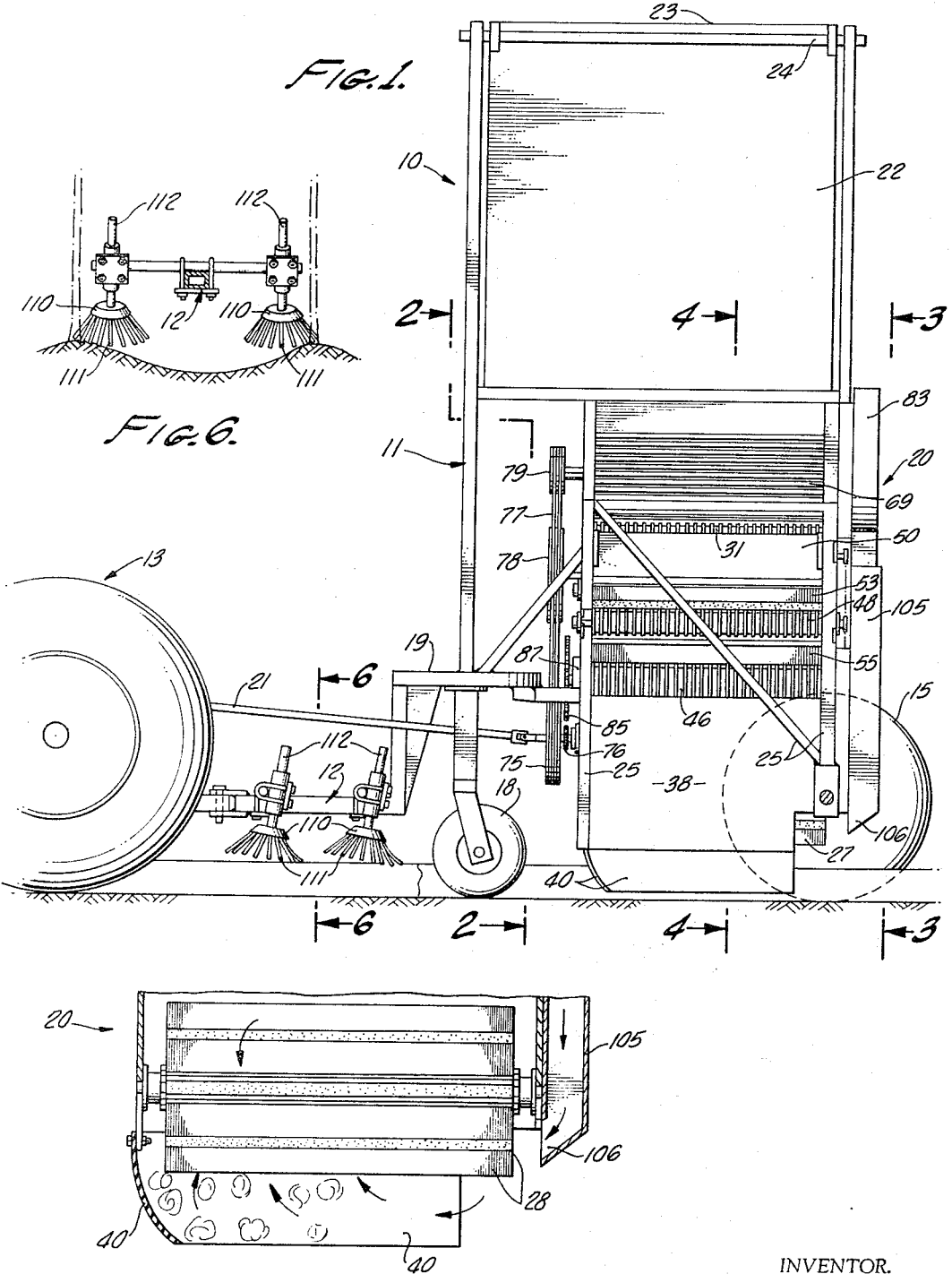

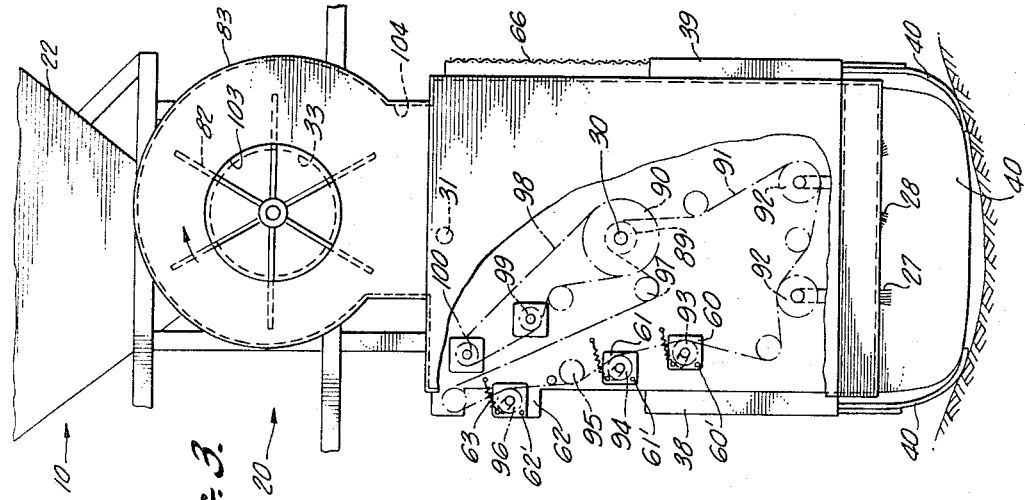
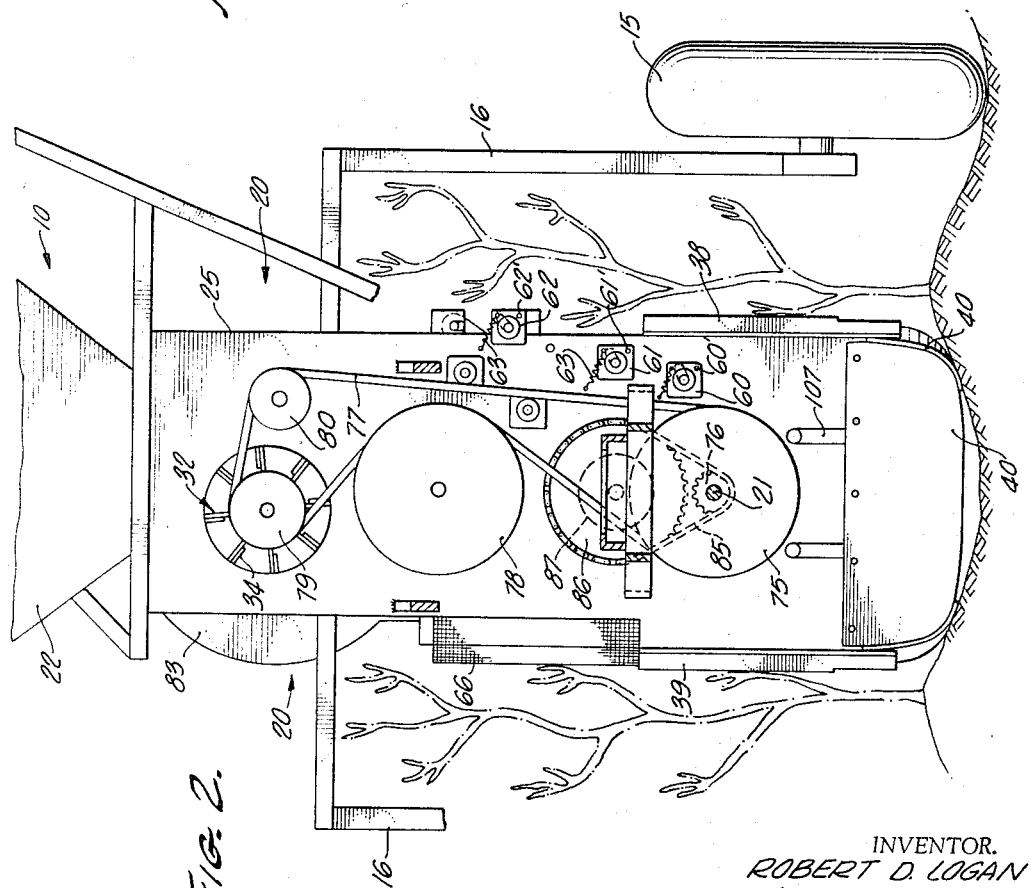

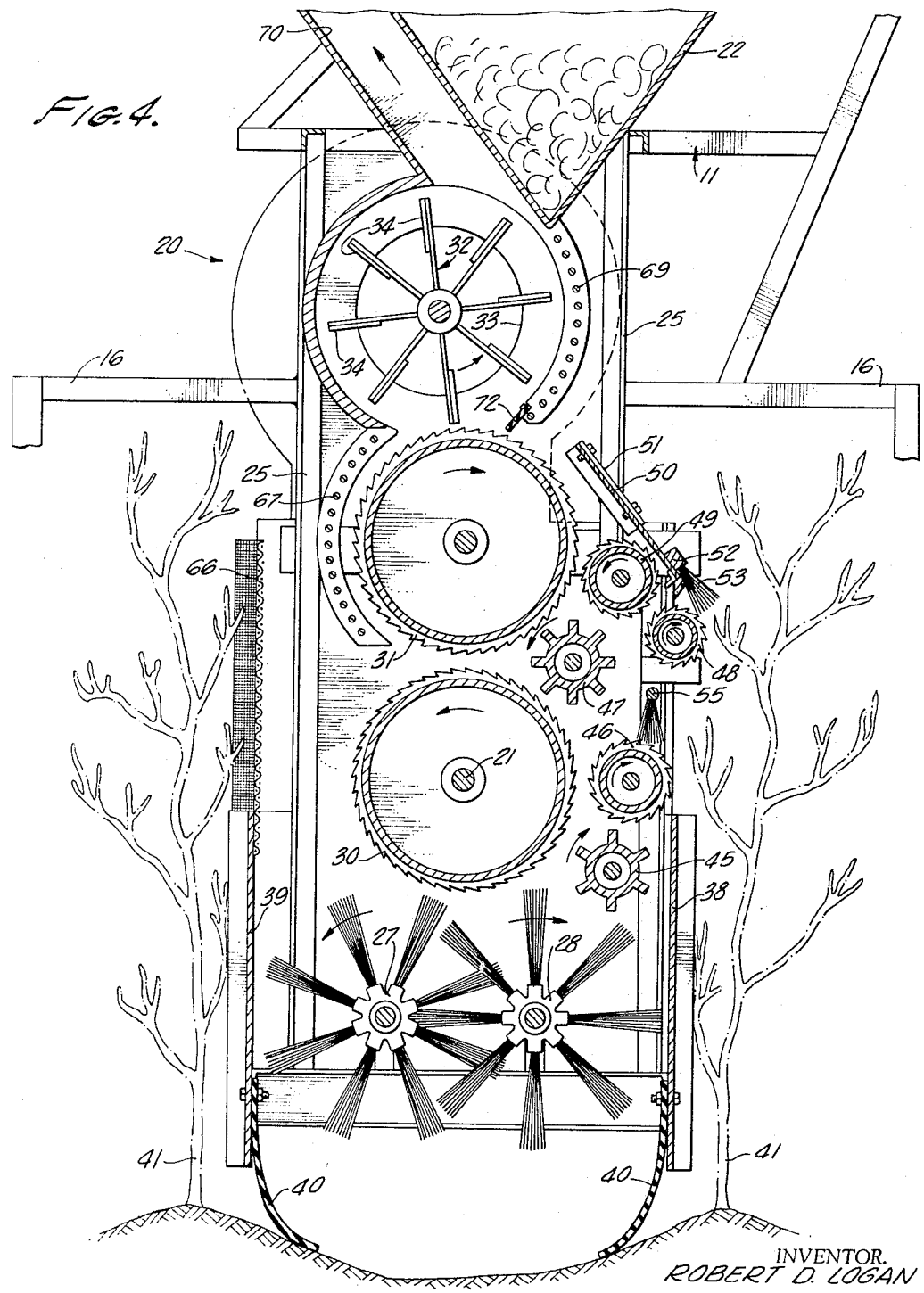

3,327,459
COTTON RECOVERY AND CLEANING
APPARATUS
Robert D. Logan, Rte. 1, Box 49, Blythe, Calif. 92225
Filed Nov. 12, 1964, Ser. No. 410,463
24 Claims. (Cl. 56—28)

This invention relates to cotton harvesting equipment and more particularly to an improved combination cotton recovery unit and cleaning device for separating out burrs, leaves, stalks and other debris.

The improved cotton scavenging and cleaning apparatus and the method practiced thereby embodies important improvements over the invention disclosed in my copending application for United States Letters Patent, Ser. No. 300,592, filed Aug. 7, 1963, entitled, Cotton Scavenger.

The equipment of the present invention is particularly suitable for recovering cotton lying on the ground or lodged in the grass or weeds close to the ground. The cotton recovery portion of the unit is supported by a suitable wheeled frame at the lower end of a housing adapted to be advanced between adjacent rows of cotton plants. The lower portion of the housing terminates in resilient guard flaps extending along the sides and across the forward end of the unit and providing a scoop-like channel along which cotton is carried by a stream of air entering the equipment from the open rear end. In this manner, cotton is swept upwardly into the interior of the equipment and into the cleaning and deburring equipment. The air sweep is also utilized to carry fallen cotton lying close to the stalks of plants either into an adjacent unscavenged portion of the field or into the particular row undergoing scavenging.

The means for carrying recovered cotton upwardly into storage means at the top of the equipment embodies novel means for separating out debris, burrs and the like to the end that substantially clean, deburred cotton only is carried into the storage bin. Burrs and debris are separated from the cotton by means embodying a combination of two principles, namely, that of burr extraction and sling-off, both principles being used in a unique and highly effective manner. The sling-off components include provision for automatically expanding to disgorge and expel large stalks, sticks or other bulky foreign objects sometimes picked up and carried into the equipment. Immediately that such foreign matter is disgorged, the rotating components performing this function return automatically to their normal operating positions.

The cotton cleaning equipment utilizes a plurality of toothed cylinders adjacent pairs of which rotate counter to one another. Also present and cooperating with the toothed cylinders are a plurality of beater rolls operating to break up and expel debris while permitting clean cotton to be carried therepast enroute to the clean cotton storage bin. A group of relatively small diameter toothed cylinders are so arranged relative to one another and to the larger toothed cylinders as to provide a tumbling chamber formed substantially entirely by rotating members and wherein the cotton and debris may be recirculated in contact until substantially all debris has been separated and discharged from the equipment leaving substantially clean cotton to be carried upwardly as it undergoes further and final cleaning prior to delivery into the storage bin.

The invention cotton cleaning and recovery equipment further features mechanism in which the incoming cotton to be treated is elevated in major part by air thereby permitting heavier and foreign components to fall away by gravity and avoiding contact of such foreign objects with the rapidly rotating components. Supplementing this separating action is an arrangement of components such that the cotton continues to be elevated while undergoing cleaning with ample opportunity for heavier and foreign components to separate by gravity while being cast laterally from the equipment and from the clean cotton path of flow. To this end, both sides of the equipment are substantially open for the discharge of debris and the like constituents from the cotton. In this way, full and advantageous use is made at all times of gravity and the effect of centrifugal forces on the heavier components. Likewise, liberal use is made of counterrotating pairs of toothed cylinders disposed on opposite sides of the cotton undergoing treatment and cleaning aided by appropriately disposed rotary beaters.

Cotton in substantially clean form is removed from the top side of the upper toothed cylinder by a combined mechanical destructor and elevating paddle wheel operating past a set of final debris-separating grid bars and within a large stream of air adequate to elevate the clean cotton into the storage means. The volume of air through which the paddle wheel operates enters from its opposite ends, and part of it in discharging through the grid bars carries along remaining finer debris while the rest of the air is used to levitate the clean cotton.

As herein shown by way of example, the combined cotton recovery and cleaning equipment is supported on a three-wheeled carriage including a castoring leading wheel coupled to a propulsion unit through a suitable tongue and a pair of rear wheels located exteriorly of the two rows of cotton plants along which the apparatus is being advanced. All power for the rotating components of the unit are driven through a power take-off unit coupled to the propulsion vehicle. Included in this power drive is an overload disconnect clutch operable in response to overloaded conditions to disengage all rotating parts except the uppermost toothed cylinder and the associated paddle wheel. These latter elements continue to rotate at all times in order to clear upper portions of the apparatus of cotton while disconnecting lower components thereby avoiding bringing further cotton into the machine. Once the upper part of the apparatus has been cleared of clean cotton, the lower components can be inspected and the cause of the overload condition can be rectified.

The main power belts for the equipment are located at its forward ends and are coupled to the power take-off of the propelling vehicle. All the remaining and auxiliary drives are located at the rear end of the machine and these utilize positive drive belts of either the flexible toothed belt type or the chain type in order that the various elements driven thereby may be maintained at predetermined relative speeds essential to the most effective and efficient cleaning and debris-separating results.

Accordingly, it is a primary object of the present invention to provide new and improved power-driven cotton scavenging and cleaning equipment capable of use while being advanced along rows of cotton plants.

Another object of the invention is the provision of a power-propelled cotton scavenging equipment useful in recovering fallen cotton directly from the ground and from weeds and grass commonly present about the stalks of cotton plants.

Another object of the invention is the provision of cotton cleaning apparatus suitable for use in cleaning cotton recovered from the ground and weeds and intermixed with substantial portions of foreign matter, dirt, stalks, leaves and other debris, and for casting aside such foreign matter while retaining cleaned cotton.

Another object of the invention is the provision of cotton cleaning equipment suitable for receiving cotton and foreign matter recovered from or near ground level and subjecting such cotton to cleaning while traveling in a generally upward direction against gravity while utilizing gravity and rotating components to expunge foreign matter while retaining clean cotton.

Another object of the invention is the provision of cotton cleaning apparatus designed to be advanced along rows of cotton plants and including a plurality of counter-rotating elongated drums arranged parallel to one another lengthwise of the rows of plants and including a tumbling chamber for cotton undergoing treatment in association with means for carrying partially clean cotton past further cleaning devices enroute to a storage receptacle for cleaned cotton.

Another object of the invention is the provision of power-propelled cotton scavenging equipment equipped with cotton-plant actuated means effective to sweep fallen cotton into a windrow centrally of the path of advance and including power-driven means and an air-levitating stream for elevating the cotton into debris and cotton separator means.

These and other more specific objects will appear upon reading the following specification and claims and upon considering in connection therewith the attached drawings to which they relate.

Referring now to the drawings in which a preferred embodiment of the invention is illustrated.

FIGURE 1 is a side elevational view of a preferred embodiment of the invention coupled to a propelling vehicle and having a power connection to the power take-off of the vehicle;

FIGURE 2 is a fragmentary front end elevational view taken generally along the broken plane indicated by line 2—2 on FIGURE 1;

FIGURE 3 is a fragmentary rear elevational view of essential components of the apparatus taken along line 3—3 on FIGURE 1;

FIGURE 4 is a fragmentary cross-sectional view on an enlarged scale taken along line 4—4 on FIGURE 1;

FIGURE 5 is a fragmentary longitudinal sectional view on a slightly enlarged scale taken through the lower portion of the cotton scavenger; and FIGURE 6 is a fragmentary sectional view taken on line 6—6.

Referring more particularly to FIGURE 1, there is shown a typical embodiment of the invention cotton scavenger, designated generally 10, having a rigid main frame 11 coupled through a drawbar 12 to a propelling tractor 13. Main frame 11 is supported at its rear on a pair of dirigible rear wheels 15 suitably connected to the lower ends of an outrigger frame 16 rigidly secured to the opposite rear corners of the main frame. The forward end of the main frame is supported on a single castoring wheel assembly 18 coupled to the main frame through a horizontally disposed thrust bearing assembly 19. Drawbar 12 is attached to front wheel unit 18 with the result that the latter is caused to pivot with and follow the movement of tractor 13.

Suitably secured to the lower central portion of main frame 11 is a cotton scavenging and cleaning unit designated generally 20 and having a flexible power drive connection 21 with the power take-off of tractor 13. Overlying the upper end of cleaning unit 20 is a large storage receptacle 22 for cleaned cotton. Preferably, the upper open end of this storage receptacle is provided with a normally closed cover 23 having a hinge connection 24 with one edge of the receptacle.

Referring now more particularly to FIGURE 4, there is shown a cross section through the interior of the scavenger and pick-up unit having a rigid frame 25 suitably supported from main frame 11. This unit, though open along its opposite lateral sides, is closed across its forward and rear ends.

Mounted lengthwise of the lower portion of the scavenger unit are a pair of brush rolls 27, 28 each equipped with rows of long stiff bristles which interleave with one another in the manner clearly illustrated in FIGURE 4. These brush rolls rotate in opposite directions, as is indicated by the arrows, and cooperate with a rising air stream in lifting cotton from an underlying windrow into contact with a toothed cylinder 30. This cylinder is equipped with closely spaced rings of sawteeth supported on the exterior of a sheet metal cylinder, as is well known by persons skilled in the cotton ginning art. Overlying cylinder 30 is a toothed doffer cylinder 31 rotating clockwise and opposite to lower cylinder 30. Mounted closely above doffer cylinder 31 is a combined fan and paddle wheel 32 likewise extending the full length of the scavenger unit and having large area inlet openings 33 at its opposite ends. Radially disposed paddle blades 34 are mounted on the arms of the paddle wheel and have functions to be explained presently. Suffice it to say at this time that this paddle wheel rotates counter to the doffer cylinder with the rim edges of its paddles spaced closely above the teeth of the latter and effective to remove cotton carried on these teeth.

The opposite sides of the lower portion of the scavenger unit have imperforate side walls 38, 39 the lower edges of which are spaced well above ground level. Attached to these lower edges are resilient flexible flaps 40 of sheet rubber, plastic or the like shaped and disposed that their lower edges ride against the ground closely inside the rows of cotton plants 41. As will be observed from FIGURE 5, guard flaps 40 extend across the forward end of the apparatus but are absent from the rear end.

Referring again to FIGURE 4, it is pointed out that important components of the cotton-cleaning and debris-ejecting portions of the apparatus are arranged lengthwise and to the right of the two cylinders 30, 31. The lowermost of these comprises a beater cylinder 45 rotating clockwise and in the same direction as the overlying toothed cylinder 46. The tips of the teeth of the latter are spaced approximately ⅝ of an inch from the tips of the teeth on cylinder 30, the same spacing existing between the teeth of the latter and the overlying doffer cylinder 31. A similar but slightly larger beater roll 47 is mounted parallel to and generally between cylinders 30 and 31 and is driven counterclockwise. Positioned above and to the right of beater 47 are a pair of sharp-toothed cylinders 48, 49 of slightly different diameters and rotating counter to one another and in the direction indicated by the arrows thereon. The spacing between the teeth of these and between the tips of cylinder 49 and doffer cylinder 31 are likewise approximately ⅝ of an inch.

Overlying toother cylinder 49 is an inclined baffle plate 50 disposed as shown and rigidly secured to the main frame as by way of mounting brackets 51 at its opposite ends. Detachably secured to the lower edge of baffle plate 50 is a brush 52 having long, flexible bristles 53 bridging the gap between cylinders 48, 49, and through which small debris is flung from the gap between cylinders 48, 49.

A generally similar long-bristled brush 55 is disposed generally vertically with the free ends of the bristles closely positioned opposite the teeth of lower cleaning cylinder 46. It will be understood that these bristles, like bristles 53, are highly effective in preventing the escape of cotton undergoing cleaning while permitting foreign matter and debris to escape therepast.

An important feature of the invention is the provision by which the apparatus automatically disgorges any large piece of foreign matter which may accidentally or otherwise enter the cleaning and separating chamber in the area overlying the cotton elevating brush roll 28. This means will be best understood by reference to FIGURES 2, 3 and 4 and to the first of of these two figures in particular, it being pointed out that the bearings or journal boxes 60, 61 and 62 for beater roll 45 and cylinders 46, 48, respectively, are each pivotally supported on the main frame by a respective pivot pin 60', 61' and 62'. Additionally, each journal box is urged to pivot inwardly against an adjustable stop (not shown) on the main frame by separate tension springs 63. As clearly appears in FIGURES 2 and 3, one end of this spring is connected to an upper portion of the journal boxes and the other end is connected to a part of the main frame and acts to hold the respective journal boxes and the rolls supported thereby rotated to their normal operating positions against the referred-to adjustable stops. Should a stone, limb of a tree, fence post, large cotton stalk or the like large piece of foreign matter be carried upwardly into the scavenging machine by the brush rolls, it will be thrown first against lower beater 45 and then against toother cylinders 46, 48 as it is carried upwardly into the machine. While being so carried, the resistance to its passage results in one or more of the pivotally supported rolls pivoting outwardly away from the other fixed cylinders of the apparatus. The resistance to such pivotal movement of the cylinders can be readily controlled by provision of suitable adjusting means for springs 63. In consequence of this action, even large objects will be transported rapidly upwardly through the debris destructor chamber and cast from the machine, usually from between cylinders 48, 49. In other cases, however, the foreign object may be slung from the machine past brush 55. No damage to any part of the machine results from the entry of the foreign matter since cylinders 45, 46 and 48 automatically and instantly open to the extent necessary to disgorge the foreign object before it can jam or damage any of the components. Immediately thereafter, tension springs 63 return the cylinders to their normal operating positions.

Referring now more particularly to FIGURE 4, it is pointed out that a large mesh screen 66 forms an extension of side wall 39 and cooperates therewith in providing a vertical passage to the left of cylinder 30 through which debris gravitates to the ground. Part of this debris may escape from between cylinders 30 and 31, but other major portions pass through grid bars 67 arranged in an arc closely embracing the left-hand side of doffer cylinder 31. This debris is carried by cotton impinged on the doffer teeth. While passing upwardly past grid bars 67, debris present in the cotton is thrown in contact with and broken by the bars and escapes between the bars in an air flow occasioned by the rotation of the doffer cylinder. All such debris falls to the ground. Any cotton which might escape with this debris is picked up by the air stream and brushes 27 and carried back into the machine for recovery.

Substantially cleaned cotton present on doffer teeth 31 is removed by the counterclockwise rotating paddle wheel 32. Should any leaves or smaller debris still be present in the cotton, this is flung into contact with the arcuate grid 69 on the right-hand side of the paddlewheel, broken, and carried away in portions of the airstream flowing through these grid bars from paddlewheel 32. The cotton, being lighter than the debris, remains on the paddles until opposite the lower end of duct 70. The rapidly flowing airstream rising through this passage carries the clean cotton along therewith and discharges it into the top of receiving receptacle 22.

Desirably, the lower edge of grid 69 is provided with a resilient guard flap 72 of rubber or the like which is effective in preventing cotton from being carried out of the apparatus. Should cotton escape past this guard, it is carried back into the cotton-cleaning chamber by the doffer teeth in cooperation with the teeth of cylinder 49 and the destructor vanes on beater 47.

The drive connections for the various rotating components will now be described, reference being had first to FIGURE 1. It will be understood that the flexible power shaft 21 drives a relatively large diameter multiple-groove belt pulley 75 and a small diameter tooth gear 76. Supported in the grooves of pulley 75 are a pair of flexible V-belts 77 which pass over and drive pulleys 78, 79 and 80, the latter being an adjustable idler controlling belt tension. Pulley 78 is connected to the shaft-supporting doffer cylinder 31 whereas the considerably smaller pulley 79 is connected to drive paddlewheel 32 as well as the blades 82 of a centrifugal fan 83 (FIGURE 3). Toothed wheel 76 drives a roller chain 85 coupled to a toothed wheel 86 driving an overload-sensitive automatically disengageable clutch 87 of known construction. Normally, this clutch remains engaged and its output is effective to drive cylinder 30. However, if the load on this cylinder exceeds a predetermined safe operating value, clutch 87 automatically disengages and remains disengaged until the resistance to rotation of cylinder 30 returns to a safe value.

From the foregoing it will be apparent that main power shaft 21 for unit 20 remains effective at all times to drive power belt 77, to rotate doffer cyclinder 31 and paddle wheel 32.

Referring now to FIGURE 3, the various drive connections for the brush rolls, the beaters and the smaller toothed cylinders will be described. It will be recalled that the power output side of overload clutch 87 is connected to the shaft supporting cylinder 30 which shaft serves as the drive shaft for important ones of the rotating cylinders in a manner now to be described. Fixed to the rear end of shaft 21 is a pair of toothed wheels 89 and 90. Wheel 89 seats a roller chain 91 passing over toothed wheels 92 fixed to the shafts of brush rolls 27 and 28, as well as over toothed wheels 93, 94, 95, 96 and 97 fixed respectively to the supporting drive shafts of beater roll 45 and for toothed cylinders 46, 48. A second roller drive chain 98 is in mesh with the teeth of drive wheel 90 and meshes with the teeth of wheels 99 and 100, respectively driving upper beater 47 and toothed cylinder 49. Both chains are in mesh with certain other toothed wheels serving as idlers and effective to maintain the drive chains in proper mesh with the toothed wheels and under appropriate tension.

The large-volume air fan 83 mounted across the rear end of the scavenger unit has an air intake opening 103 and an air discharge 104 (FIGURE 3) discharging downwardly through a duct 105 across the rear end of the apparatus. The outlet nozzle 106 for this duct discharges downwardly and forwardly across the ground, as is best shown in FIGURE 5, and will be understood as effective to lift the cotton upwardly into the path of the counter-rotating brush rolls 27, 28.

As best appears from FIGURE 2, the end walls of unit 20 are provided with slots 107 to the end that the shafts for brush rolls 27, 28 may be adjusted toward or away from the ground and relative to the underside of the toothed cylinder 30. It will be understood that each of the cylinders and beater rolls preferably are provided with any known form of adjustable journal box by which the positions of the various rolls relative to one another may be varied for the most effective operation under any particular field operating conditions.

Also, while not so shown, it is pointed out that dirigible wheels 15 may be adjusted vertically of their supporting bracket members 16 so that the entire machine may be raised or lowered to accommodate different ground contours as practiced by growers in different sections of the country to suit irrigating practices, weed control and the like.

In certain areas weeds and grass conditions about the stalks of cotton plants provide problems in that the cotton tends to gather in this growth with the result that the air jet issuing from nozzle 106 is not effective to dislodge such cotton and blow it either into the path of the air from nozzle 106 or away from the plant stalks and into the adjacent row for recovery later by passage of the scavenger down the center of that row. Under such circumstances, it is desirable to utilize rotating beaters and cotton slingers of the type shown in FIGURES 1 and 6 of the drawing. As here shown, these slingers comprise a hub 110 supporting generally conically disposed resilient fingers 111 of rubber or other suitable material supported for free rotation on the lower ends of a shaft 112 adjustably secured to some part of the apparatus such as drawbar 12. These cotton slingers are so disposed that the fingers pass between the stalks of the cotton plants with the result that forward movement of the apparatus is effective to rotate the fingers and throw loose cotton into the center of the row being swept. No driving connections for the cotton slingers are therefore required and the fingers are found highly efficient in dislodging cotton suspended in the grass and weeds and gathering such cotton in the path of the scavenger.

In this connection, attention is invited to FIGURES 1 and 5 and to the fact that the rear side corners of panels 37, 38, as well as the rear ends of guard flaps 40 are notched or cut away forwardly of nozzle 106. In consequence, air issuing from the opposite lateral corners of this nozzle passes outside guard flaps 40 and blows cotton past the base of stalks 41 and into the row next to be serviced by the scavenger. If the rotating fingers 112 just described are in use, then the opposite lateral ends of nozzle 106 may be blocked by suitable adjustable control vanes and reliance placed upon the rotating fingers to gather cotton from the weeds and from near the base of the cotton plant. Alternatively, the air jets may be used in combination with the cotton fingers.

*Operation*

The operation of the described cotton scavenging and cleaning apparatus will be quite apparent from the foregoing detailed description of its components and their structural and functional relationship one to the other. The scavenger itself is relatively light in weight and does not require a source of power mounted on the unit itself, the small power requirements being readily derived through a power take-off from the propelling vehicle. The apparatus has a closely coupled wheeled base and a short draft connection with a tractor with the result that it can be easily maneuvered about sharp corners and in close quarters.

Normally all rotating components are in operation so long as drive shaft 21 is being rotated. The following table lists diameters and relative rotational speeds for the principal members and found from experience to provide highly effective results under cotton field conditions existing in southeastern California and Arizona. It will, of course, be understood that other relative sizes and rotational speeds may be found more appropriate in other areas and under different field and climatic conditions.

| Rotating Member | Diameter, inches | Rotational Speed, r.p.m. |
| --- | --- | --- |
| 27, 28 | 15 | 65 |
| 30 | 18 | 130 |
| 31 | 18 | 520 |
| 32 | 18 | 1,500 |
| 45 | 4-6 | 130 |
| 46 | 6 | 130 |
| 47 | 6 | 520 |
| 48 | 4 | 130 |
| 49 | 6 | 600 |

From the foregoing, it will be appreciated that, in general, the rotational speed increases from the lowermost brush elements 27, 28 rotating at 65 r.p.m. as the cotton passes upwardly past the uppermost shaft for the paddle wheel which rotates at approximately 1,500 r.p.m. The counterrotating brushes together with the large volume of pressurized air issuing from nozzle 106 cooperate to lift the cotton with a minimum of debris into contact with the lower toothed cylinder 30. The teeth of this cylinder as well as of all others are closely spaced to one another and extend circumferentially of the cylinders. The relatively shallow but sharp teeth are highly effective to carry cotton but relatively ineffective in transporting debris and hard material. Such debris and foreign matter impinges upon the beaters and the teeth of the smaller cylinders where it is broken up. Much of the debris falls clear of the cotton and counter to the levitating air stream and returns to the ground without ever contacting the teeth or interfering with the cleaning operation. That debris coming in contact with lower beater 45 is broken up in major part before coming in contact with the overlying cylinder 46. Other of the debris is further broken by this cylinder, some of it being cast from the side of the machine past the bristles of brush 55 while the light fluffy cotton ordinarily cannot escape past this brush.

The relatively small chamber overlying cylinder 46 may be appropriately termed a destructor chamber because of the cooperative effect of the various rotating members therein to recirculate cotton entangled with debris until the debris is broken into small bits and slung from the machine past bristles 53 and 55. Beater 47 serves a particularly important role in this destructive action and in preventing cotton from passing between cylinders 30 and 31 until it is reasonably free of foreign matter. Smaller particles passing between these cylinders fall by gravity back to the ground along the inner side of screen 66 and panel member 39. Other particles of debris still remaining in the cotton impinged on the teeth of doffer cylinder 31 come in contact with the bars of grill 67 where they are broken and carried away in air discharging past these bars. Other portions of debris are caught by the rapidly rotating paddles 35 and brought into contact with grid bars 69. Centrifugal action and air discharging past these bars from the paddle wheel aid in carrying away final bits of debris. The cotton itself is elevated into receptacle 22 in the main airstream passing upwardly through duct 70.

Should cotton in an unusually large amount enter the machine it may overtax the machine's cleaning capacity. When this occurs the overload on the rotating parts is instantly sensed by overload clutch 87 which opens to discontinue the drive to drum 30 and to brushes 27, 28 and to the beaters and smaller toothed cylinders overlying brush 28. Meanwhile, the doffer cylinder and paddle wheel 32 continue in operation to clear cotton from these components. If the overload clutch still remains open, inspection can be made to determine the cause of malfunction and stoppage. Once this has been corrected the clutch will close and the apparatus will resume operation in the same manner described above.

The manner in which beater 45 and the two cylinders 46, 48 automatically sense the entry of a larger than usual piece of foreign matter into the apparatus and then function to disgorge this foreign object without risk of injury to these parts and their associated components has been described in detail above and need not be repeated here.

While the particular cotton recovery and cleaning apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A mobile cotton harvester for use in collecting cotton from the field comprising, a wheel-supported main frame adapted to be advanced between rows of cotton plants, a plurality of toothed cylinders mounted on said frame for rotation about parallel axes, adjacent ones of said toothed cylinders being closely spaced to one another and effective to pass cotton from one to the other, means for rotating said cylinders at progressively higher speeds in the direction of cotton flow therepast whereby cotton is impaled on the teeth of a faster rotating cylinder as it is detached from the teeth of the adjacent slower cylinder, means for gathering cotton as said harvester advances along rows thereof and passing the same into the path of the teeth on the toothed cylinder rotating at slowest speed, a plurality of debris separator and destructor cylinders rotatably supported laterally along one side of said toothed cylinders on axes parallel to the latter and cooperating with one another and with said toothed cylinders to form a debris destructor and separator chamber of rotating cylinders, power drive means for rotating some of said cylinders clockwise and some counterclockwise and at different speeds such that debris is disintegrated and cast out of said harvester as cotton is separated therefrom and retained in the harvester, and rotating means for transferring cleaned cotton from the fastest rotating toothed cylinder into storage bin means therefor mounted on said harvester frame.

2. A mobile cotton harvester for use in the field to gather cotton and clean debris therefrom as the harvester is advanced along rows of cotton, said harvester comprising a wheel-supported main frame, a pair of main toothed cylinders supported rotatably at different elevations with their adjacent sides closely spaced and parallel to one another, means for driving the upper cylinder faster than and counter to a cooperating lower cylinder to transfer cotton upwardly, means including rotating means for removing cotton from the upper cylinder and transferring the cotton to storage bin means on said harvester, means for gathering cotton and depositing the same on the teeth of the slowest one of said toothed cylinders, debris destructor means extending along one side of said toothed cylinders and cooperating therewith in providing a tumbling and debris disintegrating chamber formed essentially of rotating members supported in side-by-side spaced apart parallel relation, said rotating members including a plurality of toothed cylinders and a plurality of blade-equipped cylinders arranged to cooperate with one of said toothed cylinders in forming said tumbling chamber for retaining tumbling cotton and debris captive while the debris is being broken and cast from the tumbling chamber through the gaps between adjacent ones of said rotating cylinders.

3. A cotton harvester as defined in claim 2 characterized in that said rotating members include a blade-equipped beater spaced closely between a respective pair of said toothed cylinders and a smaller one of said toothed cylinders.

4. A cotton harvester as defined in claim 2 characterized in that at least one of said blade-equipped beaters and one of said toothed cylinders include movable supports for their opposite ends operable to permit each to shift bodily independently of one another toward and away from said toothed cylinders as necessary to pass foreign objects through and out of said tumbling chamber, and means normally holding said movable supports and the cylinders journaled therein in a predetermined normal operating position.

5. A cotton harvester as defined in claim 2 characterized in that said cotton-gathering means includes a pair of elongated counter-driven brush rolls extending generally lengthwise of the ground between adjacent rows of cotton and including air jet means for blowing cotton across the ground into the path of said brush rolls and assisting the latter in carrying the cotton against the overlying underside of the slowest of said toothed cylinders.

6. A mobile cotton harvester for use in gathering cotton from a cotton field, said harvester comprising a wheel-supported main frame, an elongated harvester unit supported thereon and adapted to extend lengthwise between adjacent rows of cotton while being advanced therealong, an elongated housing for said unit having an inlet spaced closely above the ground and formed in part of flexible lips, counter-driven brush rolls enclosed within said housing operating out of contact with the ground, power-driven toothed cylinders overlying said brush rolls operating at progressively greater speeds and effective to receive cotton from said brush rolls and including debris-disintegrating means for separating and casting out debris carried by cotton entering said housing, and air jet means for sweeping cotton across the ground between adjacent rows of cotton and cooperating with said brush rolls in elevating the cotton into contact with the teeth of the lower slowest one of said toothed cylinders.

7. A mobile cotton harvester useful in recovering fallen cotton comprising cotton pick-up and cleaning apparatus adapted to be advanced between adjacent rows of cotton, said apparatus having an upright shroud opening to the underlying ground and including flexible lip means along its sides and across its forward end defining an inlet for cotton, air jetting means extending crosswise of the rear portion of said shroud positioned and operating to sweep cotton forwardly across the ground between adjacent cotton rows and upwardly between the opposite sides of said shroud, a plurality of driven toothed cylinders at different elevations and cooperating to clean cotton of debris while advancing the cotton toward storage bin means on said apparatus, and a plurality of driven brush rolls enclosed by said shroud and effective in cooperation with said air jet means to elevate cotton from the ground into contact with the teeth of the slowest of said toothed cylinders.

8. That improvement in mobile cotton harvesting apparatus for field use which comprises a wheeled main frame having an elongated shroud open across its lower end and having flexible lip means along its opposite longer sides and across one end, air jetting means across the other end of said shroud operable to jet air along the path of advance of said apparatus to sweep cotton between adjacent rows of cotton, a plurality of driven brush rolls within said shroud operating out of contact with the ground and cooperating with one another and with said air jet to elevate cotton into the upper portion of said shroud, and power-driven separator means overlying the upper open end of said shroud for receiving the elevated cotton and treating the same to separate debris and cast the debris from said harvesting apparatus, and means for storing clean cotton.

9. Mobile cotton scavenging apparatus having a wheeled main frame, a cotton pick-up and cleaner unit mounted on said main frame, said unit having a shroud open at its upper and lower ends with the lower end supported closely above the ground, a plurality of driven brushes within said shroud operating out of contact with the ground and effective to discharge cotton upwardly toward the open top end of said shroud, means for utilizing air jets to sweep cotton across the ground and into said brushes, a driven toothed cylinder supported horizontally and overlying the upper end of said shroud and impaling cotton discharging from said brushes, grill means projecting upwardly from one top edge of said shroud to return cotton to the shroud should the cotton become detached from said toothed cylinder after completing more than half a revolution thereon, a plurality of power-driven debris-destructor cylinders along the opposite side of said toothed cylinder from said grill means cooperating with one another and with said toothed cylinder to provide a debris separating and destructing chamber of rotating components, and power-driven means for picking partially cleaned cotton from said toothed cylinder and subjecting the same to further cleaning while enroute to storage bin means on said apparatus.

10. Mobile cotton scavenging apparatus as defined in claim 9 characterized in the provision of a second driven toothed cylinder overlying and closely spaced to said first-mentioned toothed cylinder, driven paddle wheel and air circulating means receiving cotton discharging from said second toothed cylinder and for delivering airborne cotton into conduit means opening tangentially from the periphery of said paddle wheel means, and grill means arranged in an arc about said paddle wheel in the sector thereof between the point of cotton pick-up from said second toothed cylinder to the entrance to said conduit means taken in the direction of rotation of said paddle wheel.

11. Mobile cotton scavenger apparatus for use in the field to recover and clean fallen cotton while enroute to a storage bin on said apparatus, said apparatus having a main frame adapted to straddle adjacent rows of cotton and supporting thereon a combination cotton pick-up and debris separator having a plurality of relatively large diameter toothed cylinders journaled horizontally and parallel to one another and rotating at progressively higher speeds in the direction of cotton travel therepast, grill means along one side of said apparatus directly opposite the lowermost and next higher cylinders for retaining loose cotton but permitting small pieces of debris slung from said toothed cylinders to escape therethrough, combination fan and paddle wheel means driven at high speed positioned above the upper one of said toothed cylinders for transferring cotton from said upper cylinder and delivering the same along with a stream of air into a conduit opening tangentially from the upper periphery of said paddle wheel means, and air inlets at the opposite axial ends of said paddle wheel means.

12. Mobile cotton scanvenger apparatus as defined in claim 11 characterized in that said paddle wheel means includes a housing embracing the same which housing comprises grill means along one side thereof through which relatively heavy particles of debris carried in cotton can be slung as the relatively light cotton remains on said rapidly rotating paddle wheel until detached by flowing air entering said conduit.

13. A mobile cotton harvester apparatus for recovering cotton from the ground, said apparatus including a main frame supporting power-driven brush means for elevating loose cotton into the apparatus, rotating toothed means for receiving cotton and debris from said brush means, a plurality of bladed cylinders and a plurality of toothed cylinders rotating on axes parallel to one another and to said rotating toothed means and cooperating with one side of the latter in providing a debris tumbling and destructor chamber and operable to cast broken debris therefrom while retaining the cotton, and rotating toothed drum means driven at a higher speed than said first-mentioned rotating toothed means positioned to transfer partially cleaned cotton from the latter.

14. A mobile cotton harvester apparatus as defined in claim 13 characterized in the provision of movable supports for a plurality of said rotating cylinders so arranged as to permit the same to shift bodily away from an adjacent rotating one of said cylinders while permitting an extra large item of debris to escape from the apparatus, and means biasing said bodily-shiftable cylinders to remain in their respective normal operating positions.

15. Scavenger apparatus for recovering fallen cotton from a cotton field comprising, a wheeled main frame, power-driven means for elevating cotton from the ground as said apparatus passes thereover, means for receiving said elevated cotton and treating the same to separate and cast away debris, said separating means including first and second large diameter toothed cylinders driven in opposite directions and at different speeds, said first and lower speed cylinder receiving the cotton from said elevating means, first and second bladed beater cylinders rotating counter to and closely beside a respective one of said toothed cylinders and along the same side of the latter cylinders, a plurality of toothed cylinders arranged parallel to one another in an arc between and on the opposite side of said beater cylinders from said first and second cylinders and cooperating with said beaters and with said first toothed cylinder in providing cotton and debris tumbling and separating chamber formed essentially of rotating components, said cylinders being effective to cast debris from said tumbling chamber while retaining the cotton for removal by the cooperative action of said first and second toothed cylinders.

16. Cotton scavenger apparatus having a wheel-supported main frame, an elongated cotton recovery and cleaning unit mounted thereon and adapted to be located between adjacent cotton rows when in use, said apparatus having driven brush means for elevating cotton from the ground, a plurality of toothed cylinders driven at progressively higher speeds for transferring the elevated cotton into the upper part of said apparatus, a high-speed paddle wheel rotating on an axis parallel to said cylinders and positioned to receive cotton from the highest one thereof, clean cotton discharge duct means extending generally tangentially from the periphery of said paddle wheel and spaced circumferentially from said highest cylinder, grill means closely spaced from said paddle wheel opposite the portion thereof between said highest cylinder and said duct means, and air inlet openings at the opposite ends of said paddle wheel means.

17. Cotton scavenger apparatus as defined in claim 16 characterized in that said highest toothed cylinder has sawteeth contoured to allow cotton impinged thereon to fly off by centrifugal action, and grill means closely embracing said last-mentioned cylinder along one side thereof effective to hold cotton loosely impaled on said teeth while allowing debris to escape to the exterior side of said grill.

18. Cotton cleaning apparatus for cleaning cotton recovered from a field thereof and having a main frame rotatably supporting a plurality of toothed cylinders supported horizontally, means for driving said cylinders in opposite directions at progressively higher speeds from the lowermost to the uppermost cylinder, means for introducing cotton to be cleaned near the bottom of said apparatus adjacent the slowest cylinder and for removing cleaned cotton from the uppermost fastest one of said cylinders, a plurality of relatively small diameter toothed cylinders arranged in a group along and opposite one side of a pair of said toothed cylinders, means for driving adjacent ones of said small diameter toothed cylinders in opposite directions to one another and to the adjacent one of said first-mentioned cylinders and cooperating therewith and with one another to form a debris destructor and a cotton cleaning chamber.

19. Cotton cleaning apparatus as defined in claim 18 characterized in the provision in said cotton cleaning chamber of a power-driven beater cylinder located opposite the gap between said first-mentioned toothed cylinders and through which cotton flows as it transfers from the slowest rotating cylinder to the adjacent cylinder operating at higher speed.

20. Cotton cleaning apparatus as defined in claim 19 characterized in the provision of arcuate grid bar means closely spaced outwardly from the periphery of said toothed cylinder operating at higher speed and located on the side thereof opposite said cotton cleaning chamber.

21. Cotton cleaning apparatus as defined in claim 18 characterized in that said means for introducing cotton into the bottom portion of said apparatus includes power-driven means for elevating cotton and carrying the same into contact with the underside of said slowest speed toothed cylinder.

22. Cotton cleaning apparatus as defined in claim 21 characterized in that said power-driven means includes means for elevating cotton to be cleaned in a stream of air under superatmospheric pressure.

23. Cotton cleaning apparatus as defined in claim 21 characterized in the provision of rotary cotton sweeper wheels mounted on the advance end of said apparatus and including a ring of conically arranged resilient fingers arranged to be rotated by contact with the cotton row and growth therealong and operating as said apparatus advances to sling fallen cotton into the path of advance for recovery by said apparatus.

24. Cotton cleaning apparatus as defined in claim 23 characterized in the provision of a pluarlity of said cotton sweeper wheels with at least one thereof along either side of said apparatus and arranged to rotate in opposite directions as said apparatus advances down the field.

References Cited

UNITED STATES PATENTS

| | | | |
|---|---|---|---|
| 2,730,855 | 1/1956 | Thomas | 56—28 |
| 2,995,884 | 8/1961 | Pace | 56—29 |
| 3,070,942 | 1/1963 | Mitchell et al. | 56—35 |
| 3,100,368 | 8/1963 | Logan | 56—28 X |

ABRAHAM G. STONE, *Primary Examiner.*

RUSSELL R. KINSEY, SAMUEL KOREN,
*Examiners.*